United States Patent [19]

Tominaga

[11] Patent Number: 4,574,738
[45] Date of Patent: Mar. 11, 1986

[54] FEED CONTAINER FOR PET BIRDS
[75] Inventor: Kazutoshi Tominaga, Higashi Osakashi, Japan
[73] Assignee: Kabushiki Kaisha Tominaga Jyushikogyosho, Higashi Osakashi, Japan
[21] Appl. No.: 663,884
[22] Filed: Oct. 23, 1984
[30] Foreign Application Priority Data
Oct. 27, 1983 [JP] Japan ................................ 58-202001
[51] Int. Cl.⁴ ........................................... A01K 39/01
[52] U.S. Cl. .................................... 119/18; 119/52 R
[58] Field of Search ................................. 119/18, 52 R
[56] References Cited
U.S. PATENT DOCUMENTS 198,846  1/1878  Hendryx ................................ 119/18
2,174,725 10/1939 Hutaff, Jr. .............................. 119/18
2,642,038  6/1953 Howling et al. .................... 119/18 X
3,179,244  4/1965  Kuhn ............................ 119/52 R X
4,029,051  6/1977  McKinney ........................ 119/52 R

FOREIGN PATENT DOCUMENTS 249196  9/1962  Australia ........................... 119/52 R Primary Examiner—Robert P. Swiatek
Attorney, Agent, or Firm—Collard, Roe & Galgano

[57] ABSTRACT

A feed container for pet birds, the container consisting of a first container and a second container. The first container containing dry food is inserted in the second container such that the dry food is allowed to drop onto the bottom of the second container, as the pile diminishes. The thrown food is kept fresh. When the first container is inserted in the second container the total shape is compact, and is wrapped in a wrapper for sale. The feed container of the invention is usable not only as a feeder, but also as a feed package on the market.

6 Claims, 6 Drawing Figures

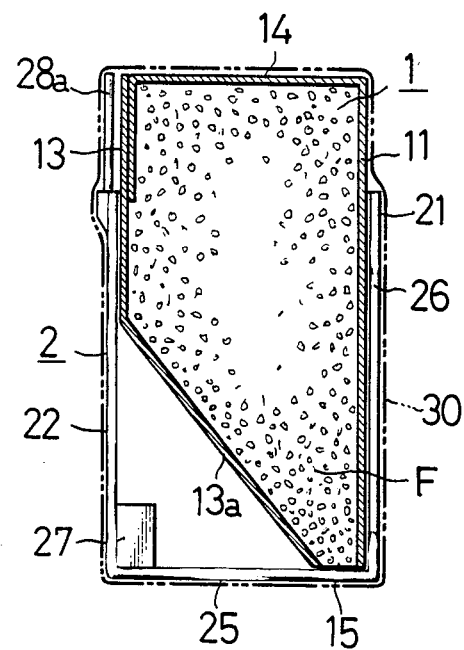
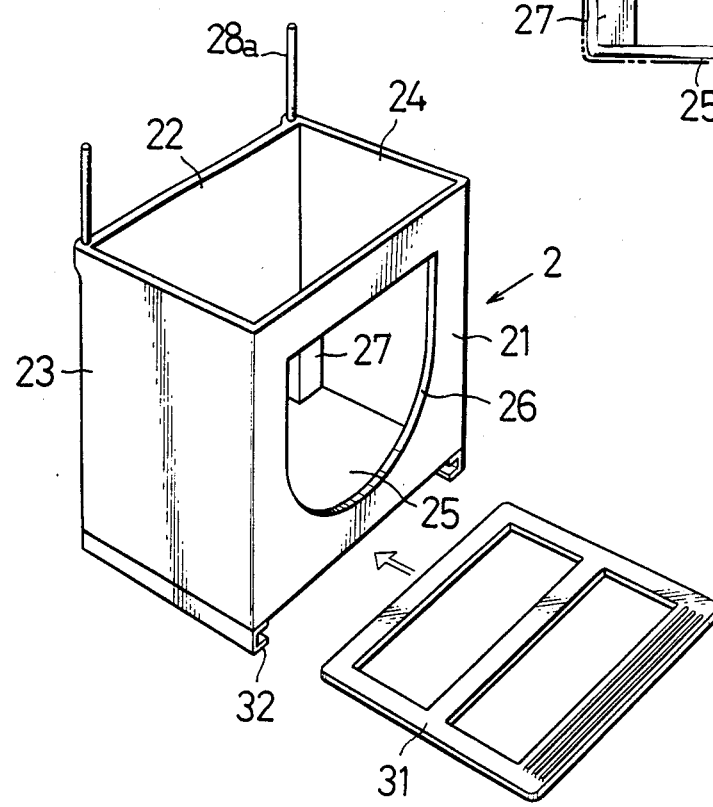

ial Model No. 56(1981)-36269 discloses an automatic
FEED CONTAINER FOR PET BIRDS

BACKGROUND OF THE INVENTION

1. Field of the Invention

The present invention relates to a feed container for pet birds, and more particularly, to a feed container for pet birds, the container being usable as a package on the market as well as a feeder for household use.

2. Description of the Prior Art

Conventionally, dry food for pet birds is sold in a paper bag or box. The users transfer a necessary amount of food from the bag to their feeder every day or every other day. It may be a pleasure for some pet lovers to do it, but it is troublesome for many others, especially people working outside.

Recently, automatic feeders have been developed, and are widely used. For example, Japanese Utility Model No. 56(1981)-36269 discloses an automatic feeder which enables the food in the container to drop into the feeder to lay in the stock in an automatic manner. However, the feeders are stained with birds' droppings as time goes. It is necessary to clean the feeders with water. This is a nasty and insanitary work even for pet lovers.

OBJECTS AND SUMMARY OF THE INVENTION

The present invention is directed to solve the problems pointed out above, and has for its object to provide a feed container usable not only as a feeder but also as a package of food on the market, thereby dispensing with the necessity of transferring the content of the package to the feeder.

Another object of the present invention is to provide a feed container which supplies a necessary amount of feed to lay in a stock in the feeder.

A further object of the present invention is to provide a feeder of simple and inexpensive construction, thereby making it disposble when the feeder is stained with the birds' droppings.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a feed container for pet birds, the container comprising:

a first container and a second container, wherein the first container is insertable in the second container;

said first container having a sloped wall portion in at least one of the side walls, and an opening located where said sloped wall terminates, said opening being adapted to allow the content of said first container to drop therethrough;

said second container having an aperture in its front wall through which the bird in the cage picks at the feed piling up in the second container; and means for allowing said first container to rest thereon so as to provide a space between said opening and the bottom of said second container.

BRIEF DESCRIPTION OF THE DRAWINGS

FIG. 5 is a vertical cross-section through the feed container in the state shown in FIG. 4;

FIG. 6 is a perspective view showing a modified version of the embodiment.

DETAILED DESCRIPTION OF THE PREFERRED EMBODIMENT

Figure 3:
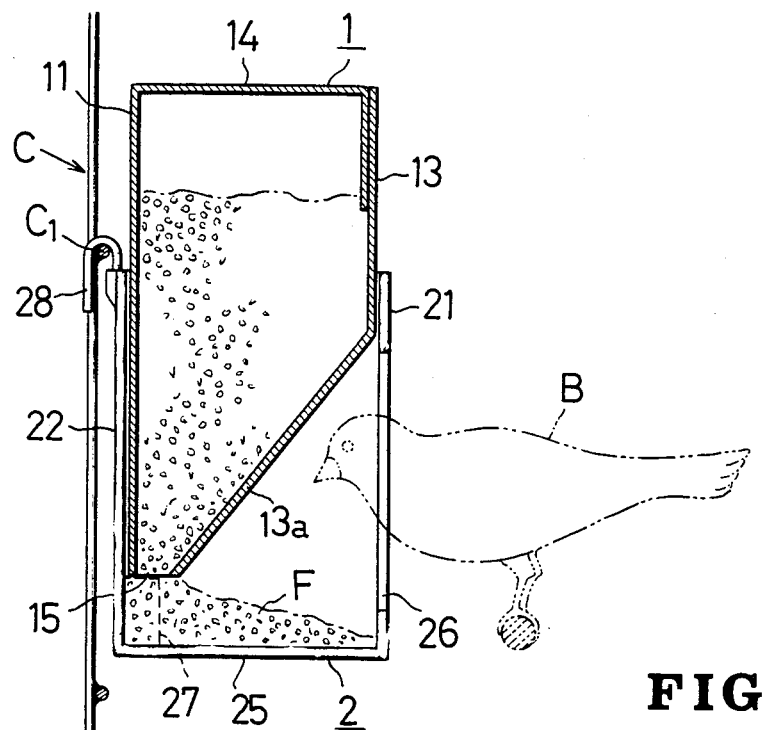
FIG. 3 is a vertical cross-section through the feed container of FIG. 1.

The feed container of the present invention has a first container 1 and a second container 2 adapted to accept the first container 1. Each container is box-shaped with six sides, but the second container is top-opened so as to allow the first container to be inserted therethrough. The first container 1 has a unique shape as best shown in FIG. 3. The reference numerals 11, 13, and 12 denote a rear wall, a front wall, and side walls, respectively. The front wall 13 has a sloped portion 13a extending from its middle portion toward the bottom. In the illustrated embodiment the first container has no bottom wall, but an opening 15 produced as a slit at which the sloped portion 13a terminates. The sloped portion 13a is intended to provide a space in the second container when it is inserted in the second container as shown in FIG. 3. The opening 15 can be produced in any way; for example, the bottom wall having an already made opening can be used.

The second container 2 has an ordinary top-opened box shape, defined by a front wall 21, a rear wall 22, side walls 23, 24 and a bottom wall 25. The front wall 21 has an aperture 26 of relatively large size through which the bird (B) in the cage (C) picks the food pile accumulating on the bottom 25. The reference numeral 27 denotes posts on which the first container 1 rests with a space under the opening 15. This space allows the content of the first container to drop onto the bottom 25. Preferably, the posts 27 are located at the corners of the rear wall 22. The content of the first container 1 continues to drop until the pile reaches the open end of the opening 15 as shown in FIG. 3. As the pile diminishes, the content drops until the pile clogs the opening 15 again. The height of the posts 27 is decided such that the open end of the opening 15 is slightly above the level of the lowermost edge of the aperture 26. If the open end is maintained too high, an excessive amount of feed is likely to drop and deposit on the bottom wall 25 of the second container 2.

Figure 2:
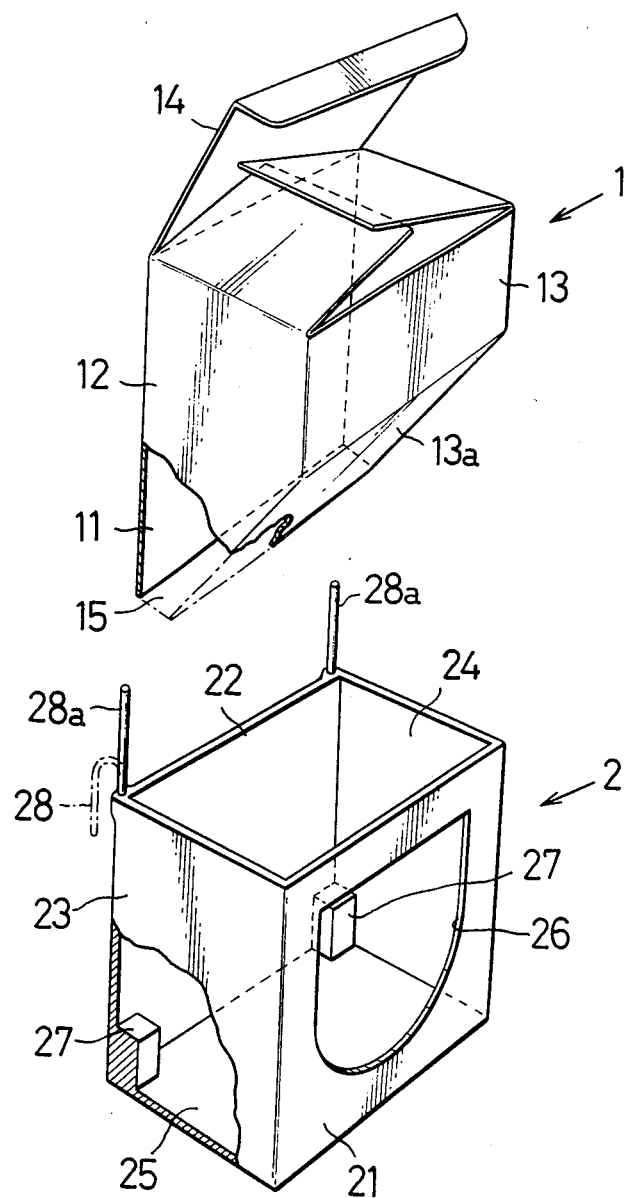
FIG. 2 is a perspective view of the feed container of FIG. 1 when it is disassembled into a first and a second container.

The first container 1 is made by folding a relatively thick paper, wherein the top wall 14 is openable by unfolding it as shown in FIG. 2. The second container 2 is made of plastics, and has a rigid body.

Figure 4:
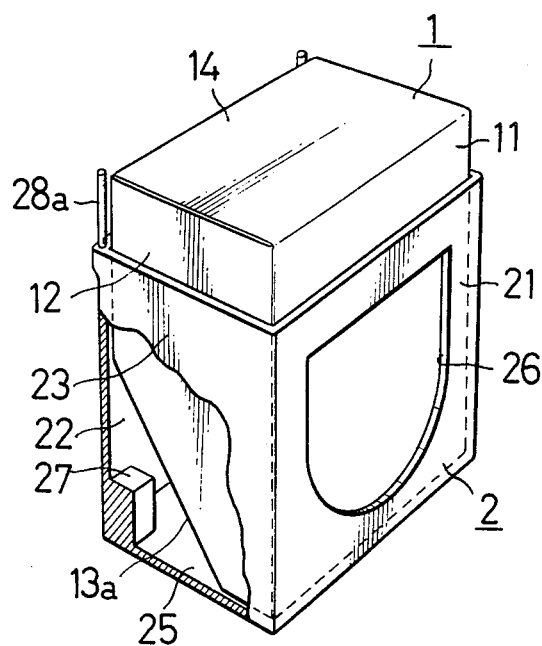
FIG. 4 is a perspective view showing the feed container when it is placed on the market as a packed dry food for birds.

As shown in FIGS. 3 and 4, the second container 2 is provided with hooks 28 whereby the second container 2 is secured to a bar C₁ of the cage (C). The reference numeral 28a in FIG. 4 denotes a slender rod which is bent into the hook 28 shown in FIG. 3.

In use the first container 1 is inserted in the second container 2 such that the opening 15 is kept away from the bottom wall 25 as best shown in FIG. 3. The opening 15 is covered with a thin paper or the like, and before the first container 1 is inserted in the second container 2, the cover must be broken. On the market, however, the first container 1 is inserted in the second container 2 such that the closed opening 15 comes into abutment with the bottom wall 25 of the second container 2 as best shown in FIG. 5. The overlapped containers 1 and 2 are wrapped in a suitable wrapper 30 for sale. Desirably, the wrapper 30 is a moistureresistant plastic film so as to protect the dry food against moisture.

The user buys the dry food for birds packed in this way, and when it is in use, the opening 15 is broken, and the first container 1 is inserted such that it rests on the posts 27. The rods 28a are bent into hooks 28, and the container 1 is secured to the cage (C).

Figure 1:
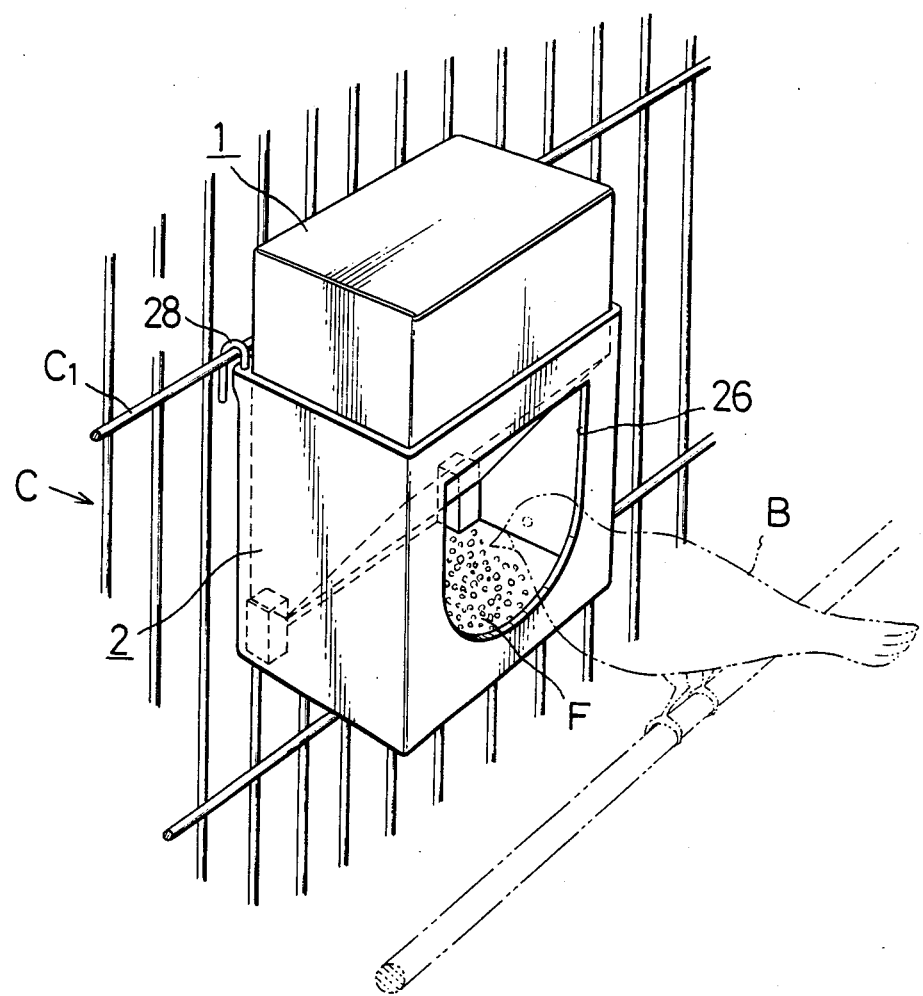
FIG. 1 is a perspective view showing a feed container embodying the present invention.

FIG. 6 shows a modified second container which is provided with a slidable perch 31. The perch 31 is drawn into the second container 2 like a drawer. In use the perch 31 is pulled out, and when not in use, it is drawn under the bottom wall 25 of the second container 2. The second container 2 is provided with rails 32 along which the perch 31 is slided. When the perch 31 is fully drawn, the total compactness as shown in FIG. 5 is maintained. In FIG. 1 a perch bar is illustrated in dot lines, but when the slidable perch 31 is used, no perch bar is required at least in front of the feed container 2.

We claim:

1. A disposable assembly for containing and dispensing feed to pet animals, such as birds and the like, comprising:

a first container having walls defining a generally closed space for holding feed, said first container having a sloped side wall portion disposed opposite to a straight wall, said first container having an opening disposed where said sloped wall terminates adjacent to said straight wall, said opening adapted to allow feed to drop therethrough;

a second container having walls, including a front wall defining an aperture, and a bottom, which define an enclosure into which said first container is slidably and interchangeably insertable in a first position and a second position, said enclosure adapted to fit closely around said first container on all sides;

means adjacent the bottom of said second container for allowing said first container to rest within said second container with a space between said opening and said bottom of said second container;

said assembly providing a closed shipping and storage package for animal feed when said first container is inserted into said second container in said first position wherein said straight wall is disposed adjacent to, and closes off, said aperture and said bottom closes off said opening; and said assembly providing an animal feeder when said first container is inserted into said second container in said second position wherein said sloped wall is disposed adjacent to said aperture, said aperture thereby remaining open so that an animal can gain access through the aperture, to the feed flowing from said first container into said second container.

2. A feed container as set forth in claim 1, wherein the first container is made of paper.

3. A feed container as set forth in claim 1, wherein the second container is made of plastics.

4. A feed container as set forth in any of claim 1, wherein the opening is maintained at a point not lower than the lowermost edge of the aperture.

5. A feed container as set forth in any of the claim 1, wherein the second container is provided with means whereby the second container is secured to the cage.

6. The assembly according to claim 1, wherein said opening is sealed with a covering which retains the feed totally within said first container, until said covering is broken in preparation for dispensing the food into said second container.

* * * * *